(12) United States Patent
Govindarajan et al.

(10) Patent No.: US 10,701,021 B2
(45) Date of Patent: Jun. 30, 2020

(54) COMMUNICATION PLATFORM FOR MINORS

(71) Applicant: Facebook, Inc., Menlo Park, CA (US)

(72) Inventors: Tarunya Govindarajan, San Francisco, CA (US); Zachary W. Gomez, Redwood City, CA (US); Michael Novati, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 82 days.

(21) Appl. No.: 15/709,920

(22) Filed: Sep. 20, 2017

(65) Prior Publication Data
US 2019/0089669 A1 Mar. 21, 2019

(51) Int. Cl.
*G06F 15/16* (2006.01)
*H04L 12/58* (2006.01)
*H04L 29/06* (2006.01)
*G06F 21/12* (2013.01)
*G06Q 10/10* (2012.01)
(Continued)

(52) U.S. Cl.
CPC ............ *H04L 51/32* (2013.01); *G06F 21/121* (2013.01); *G06F 21/31* (2013.01); *G06F 21/606* (2013.01); *G06Q 10/10* (2013.01); *G06Q 50/01* (2013.01); *H04L 51/02* (2013.01); *H04L 63/102* (2013.01); *H04L 63/104* (2013.01); *H04L 67/104* (2013.01); *G06F 2221/2149* (2013.01)

(58) Field of Classification Search
CPC ....... H04L 51/32; H04L 63/10; H04L 63/101; H04L 63/102; H04L 63/104; H04L 29/06; H04L 41/00; H04L 41/28; G06F 21/31; G06F 21/121; G06Q 10/10; G06Q 50/01

USPC ................. 709/228, 229, 230, 227
See application file for complete search history.

(56) References Cited

U.S. PATENT DOCUMENTS 9,571,590 B2 * 2/2017 Hodges ................. G06Q 10/10
2008/0288277 A1 * 11/2008 Fasciano ............ G06Q 20/1085
705/319

(Continued)

FOREIGN PATENT DOCUMENTS

KR 2017-0085316 7/2017

OTHER PUBLICATIONS

International Search Report and the Written Opinion for International Application PCT/US2017/052622, dated Feb. 23, 2018.

(Continued)

*Primary Examiner* — Thu Ha T Nguyen
(74) *Attorney, Agent, or Firm* — Baker Botts L.L.P.

(57) ABSTRACT

In one embodiment, a method includes a device receiving a request to connect a minor with another user within a social-networking system. The minor and the user may be associated with a first and a second account, respectively. The device may identify the minor's guardian. A first approval request may be sent to the minor or the guardian to seek approval of the requested connection between the minor and the other user. The first approval request may be sent to the guardian upon determining that the request is initiated by the minor, or it may be sent to the minor upon determining that the request is initiated by the guardian. The device may send a second approval request to the other user to seek approval of the requested connection as well. When the requests are approved, a connection may then be established between the minor and the other user.

20 Claims, 5 Drawing Sheets

(51) Int. Cl.
*G06F 21/31* (2013.01)
*G06Q 50/00* (2012.01)
*G06F 21/60* (2013.01)
*H04L 29/08* (2006.01)

(56) References Cited

U.S. PATENT DOCUMENTS

| | | | | |
|---|---|---|---|---|
| 2009/0055915 | A1* | 2/2009 | Piliouras | G06F 21/41 |
| | | | | 726/8 |
| 2009/0187994 | A1* | 7/2009 | Rapo | H04L 63/102 |
| | | | | 726/27 |
| 2010/0250497 | A1* | 9/2010 | Redlich | F41H 13/00 |
| | | | | 707/661 |
| 2012/0047560 | A1* | 2/2012 | Underwood | G06Q 10/06 |
| | | | | 726/4 |
| 2012/0151046 | A1* | 6/2012 | Weiss | G06F 21/604 |
| | | | | 709/224 |
| 2012/0151047 | A1* | 6/2012 | Hodges | G06F 21/604 |
| | | | | 709/224 |
| 2012/0290950 | A1* | 11/2012 | Rapaport | H04L 51/32 |
| | | | | 715/753 |
| 2013/0036458 | A1* | 2/2013 | Liberman | H04L 9/3231 |
| | | | | 726/6 |
| 2013/0036459 | A1* | 2/2013 | Liberman | H04L 9/0866 |
| | | | | 726/6 |
| 2013/0060850 | A1* | 3/2013 | Davis | G06Q 30/08 |
| | | | | 709/204 |
| 2013/0159123 | A1* | 6/2013 | Hochberg | G06Q 30/06 |
| | | | | 705/26.1 |
| 2013/0159519 | A1* | 6/2013 | Hochberg | G06Q 50/01 |
| | | | | 709/225 |
| 2013/0198815 | A1* | 8/2013 | Piliouras | H04L 63/10 |
| | | | | 726/4 |
| 2013/0290700 | A1* | 10/2013 | Davis | H04L 63/0428 |
| | | | | 713/153 |
| 2013/0297693 | A1* | 11/2013 | Miller | G06Q 50/01 |
| | | | | 709/204 |
| 2014/0344370 | A1 | 11/2014 | Kadashevich | |
| 2014/0359018 | A1* | 12/2014 | Sun | H04L 51/046 |
| | | | | 709/204 |
| 2015/0095410 | A1* | 4/2015 | Funahashi | H04L 67/2857 |
| | | | | 709/203 |
| 2015/0264091 | A1* | 9/2015 | Lin | H04L 67/12 |
| | | | | 709/228 |
| 2015/0264723 | A1* | 9/2015 | Cheng | H04W 48/10 |
| | | | | 455/41.2 |
| 2015/0264731 | A1* | 9/2015 | Lin | H04W 4/21 |
| | | | | 455/41.2 |
| 2015/0356453 | A1 | 12/2015 | Shah | |
| 2016/0048932 | A1* | 2/2016 | McNelley | G06Q 50/01 |
| | | | | 705/5 |
| 2016/0224562 | A1* | 8/2016 | Tiwari | G06F 16/24578 |
| 2016/0253616 | A1 | 9/2016 | Mihalik | |
| 2016/0267601 | A1* | 9/2016 | Kundu | G06Q 20/10 |
| 2016/0337335 | A1 | 11/2016 | Satoh | |
| 2017/0048174 | A1 | 2/2017 | Charignon | |
| 2017/0195310 | A1* | 7/2017 | Tyler | G06F 21/6245 |
| 2019/0007381 | A1* | 1/2019 | Isaacson | G06Q 30/0641 |
| 2019/0089669 | A1* | 3/2019 | Govindarajan | G06Q 10/10 |
| 2019/0340906 | A1* | 11/2019 | Williams | G08B 21/0283 |
| 2020/0090279 | A1* | 3/2020 | Ginsberg | G06Q 40/06 |

OTHER PUBLICATIONS

Extended Search Report for EP Patent Application No. 18165463.3-1222, dated Jun. 8, 2018.

* cited by examiner

COMMUNICATION PLATFORM FOR MINORS

TECHNICAL FIELD

This disclosure generally relates to a communication platform for minors.

BACKGROUND

Social interaction platforms, such as messaging and group-chat platforms, may allow users to quasi-synchronously interact with one another through a network. Any user may instantly reach out to and communicate with any other user. For example, one user may search for another user (e.g., by name, location, etc.), request approval from that user to connect, and begin messaging upon approval. A social interaction platform may allow a user to contact strangers and/or be contacted by strangers. Typical platforms provide users with autonomy over whom they interact with.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing system of a user. A user may also install software applications on a mobile or other computing system of the user for accessing a user profile of the user and other data within the social-networking system. The social-networking system may generate a personalized set of content objects to display to a user, such as a newsfeed of aggregated stories of other users connected to the user.

A mobile computing system—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing systems may also execute software applications, such as games, web browsers, or social-networking applications. With social-networking applications, users may connect, communicate, and share information with other users in their social networks.

SUMMARY OF PARTICULAR EMBODIMENTS

Particular embodiments described herein provide parents control over their children's online social network and messaging partners. As with users of any other age group, minors (e.g., individuals at or under age 13) may want to socially connect with their friends online through messaging, chat groups, gaming, etc. Guardians (e.g., parents, grandparents, older siblings, legal guardian, etc.) of minors, however, may not feel comfortable giving minors total freedom to connect with anyone they want through social interaction platforms designed for general users. For instance, guardians may want to ensure that minors do not interact, whether intentionally or unintentionally, with child predators, inappropriate adults, or undesirable peers (e.g., those who are bullies, bad influences, etc.). In other words, guardians may want some degree of control and supervision over whom the minors interact with.

While conventional social interaction platforms may provide users the freedom to manage their own social interactions, this may not be suitable for minors. Particular embodiments described herein provide minors an interaction platform through which they may safely interact (e.g., chat, play games) with individuals who have been approved by their parents/guardians. Through this platform, guardians may serve as gatekeepers and have control over the communications and interactions of minors under their guardianship. For instance, guardians may limit contacts of the minors to an approved list, thereby ensuring that only age-appropriate content is accessible to the minors. Thus, the platform allows minors to interact with each other while being under the supervision of their respective guardians.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
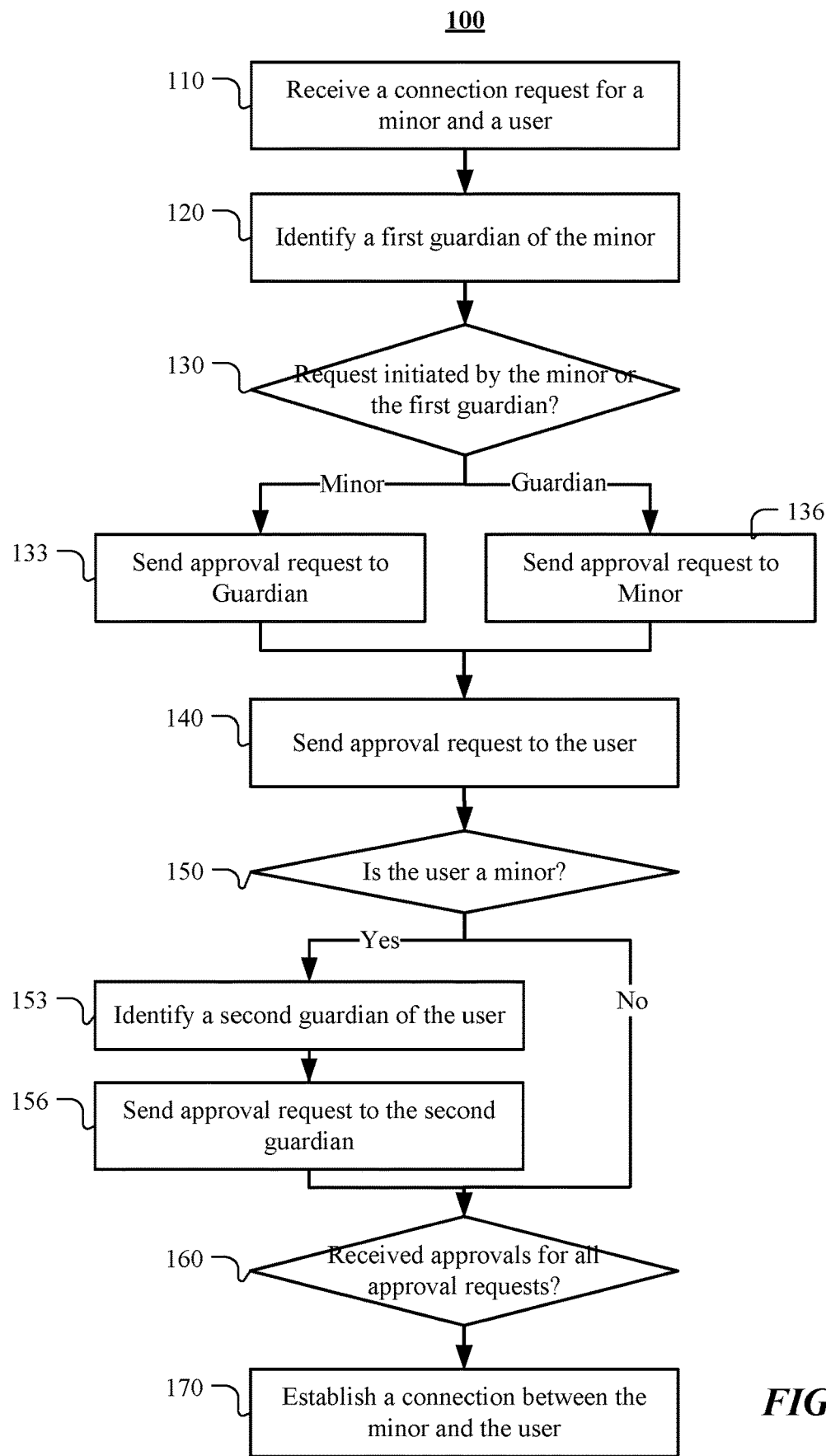
FIG. 1 illustrates an example method for establishing a connection between a minor and another user.

Particular embodiments described herein provide a social interaction platform that allows minors to interact with each other while being the under the supervision of their respective guardians. Through this platform, guardians may serve as gatekeepers and have control over the communications and interactions of minors under their guardianship. For instance, guardians may limit contacts of the minors to an approved list, thereby ensuring that only age-appropriate content is accessible to the minors.

In particular embodiments, a social-networking system may be associated with a messaging application designed for general users (hereinafter referred to as "GU Apps"). The GU App may provide each user with autonomy over his/her own social interactions, including finding and requesting connections with other users, approving connection requests, and messaging other users, among other social-interaction features providing by the GU App. Therefore, a mature user may prefer to use the GU App for the freedom it affords its users. A GU App, however, may not be suitable for minors. As described above, guardians may not feel comfortable exposing those under their guardianship to the world without supervision and protection. For instance, if a minor were to use the GU App, the minor may sought out (deliberately or unintentionally) or receive connection requests from any other user without the guardian knowing. Therefore, from the perspective of a guardian and/or minor, the GU App may be an unprotected environment in which a minor may be exposed to inappropriate and/or unwanted interactions, content, and influences.

To provide a safe social-interaction platform for minors, the social-networking system may further be associated with another messaging application designed for minors (hereinafter referred to as "PG Apps"). In addition to messaging, the PG App may provide users with group chatting, interactive gaming, or any other communication or social interaction features. Unlike an application designed for general audience, this minor's application provides various features that allow a guardian of a user (presumed to be a minor) to have oversight over whom the minor user may interact with.

Minors may interact with one another through the PG App. For example, two minors may have PG Apps installed on their respective devices and communicate with each other. A minor may also use his PG App to interact with another person (e.g., an adult or another minor) who is using, e.g., the GU App. For example, a parent or grandparent may use his/her own GU App associated with the social-networking system to communicate with a minor on a PG App. This provides non-minors with the convenient option of using their own messaging apps to communicate with minors using PG Apps without the need to install and use the PG App themselves. In particular embodiments, the PG App and GU App may have the same backend social-networking system. In this manner, users of the PG App and GU App may connect and interact with each other despite using different applications.

In particular embodiments, the social-networking system may have separate account types for minors and non-minors. For example, a minor using the PG App may have a minor account, and a guardian or any user of the GU App may have a "regular," non-minor account. Both the minor account and the regular account may be represented as entities (e.g., as nodes) within a social graph, but there may be several differences. For example, while a regular account may exist independently, a minor account in particular embodiments may necessarily be linked to or dependent from the minor's guardian's account, which will be referred to as "guardian account." In addition, a minor account may be linked to one or more guardian accounts (e.g., a child may be linked to the accounts of both his parents). In particular embodiments, the access rights of minor accounts may be different from that of regular accounts (which includes guardian accounts). While a minor account may be represented in the social graph, it may not necessarily be an account for the social-networking system. In other words, a minor account may be used to access the PG App but not necessarily the social-networking system. In contrast, a regular account may be represented in a social-networking system's social graph and may be used to access the social network (e.g., a regular user may use his regular account credentials to log in to the online social network and the GU App associated with the network). In particular embodiments, both account types may be used to log into the PG App, but different features may be enabled depending on the account type. For example, a regular account may be used by a guardian to log into the PG App to setup the App for a minor (e.g., granting a specific minor permission to use the PG App, identifying a list of approved contacts, etc.), but the guardian account may not necessarily allow the guarding to use the PG App as a typical PG App user. In contrast, a minor who logs into the PG App using his/her minor account may not be provided with the setup or management features that would otherwise be provided to a guardian. Another difference between the accounts types is that collection and usage of data associated with a minor account may be severely limited to preserves the privacy of minors. For example, data associated with a minor account, unlike that of a regular account, may not be subject to the social-networking system's automated data mining/analysis operations.

In particular embodiments, a guardian may create minor accounts for minors under the guardian's guardianship (e.g., a parent may create minor accounts for his/her children). This may be done through the guardian's social-networking system's user interface. For example, the guardian may log into his/her social-networking account and indicate that a minor account is to be created and linked to the guardian's account. Alternatively, a guardian may also create a minor account when the guardian logs in through the PG App during initial setup. For example, when a guardian logs in to a PG App, he/she may have the option to create a new minor account or select an existing minor account linked to his/her guardian account. Through either interface, the guardian may also specify additional guardian accounts for the minor account.

In particular embodiments, a guardian may help a minor setup a PG App installed on the minor's device, which may be a smart phone, tablet, laptop, desktop, or any other type of computing device. Initially, a guardian may sign in to his/her guardian account via the PG App and specify that the App may be used by specified minors. The guardian may create and link a minor account to his/her guardian account at that time, or select from a list of previously created minor accounts. Based on the guardian's permissions and selections, the PG App may store an indication that the guardian user has approved the use of the App by the selected minor(s). For example, the PG App may store the minor account ID, and may additionally store the IDs of the linked guardian accounts. In particular embodiments, the PG App may store such information locally on the device on which the PG App is installed. As such, even though the minor may use the PG App on that particular device, the minor may not use PG Apps on other devices unless his/her guardian expressly configured those PG Apps to be used by the minor. In particular embodiments, the PG App may also store the permission information on a remote server, in which case a minor may use his/her login credentials to gain access to PG Apps installed on any device upon server verification of the credentials.

Since young users may have difficulty remembering authentication credentials, in particular embodiments the PG App may not require any credentials to be entered after the initial setup is complete. In other words, the PG App may assume that its user is the approved minor. This may be an acceptable assumption for guardians, since the device itself may require some form of authentication (e.g., finger print or pattern credentials) and usage of the PG App is under the guardian's supervision anyway. In particular embodiments, the PG App may require a simple, kid-friendly authentication. For example, the authentication may be based on emoji patterns (e.g., smile, smile, sad).

As will be described in further detail below, particular embodiments described herein require a guardian to approve connection requests made by or to a minor. In particular embodiments, a guardian may review and approve such request through the social-networking system or the guardian's GU App. To guard against the possibility of a minor accessing his/her guardian's device without permission to grant connection approvals, the system may send a notification to the guardian after a sufficiently long time delay (e.g., 1 day, 3 days, etc.) so that the minor, who is assumed to have gained control of the guardian's device at least temporarily, would not be able to delete the notification. The notification may be sent as an email, text message, an automated phone call, a notification through the guardian's social-networking application, or any other suitable means of communication. In this manner, even if a minor impermissibly approved a connection for himself, his guardian may later know of the fact and take appropriate action.

In particular embodiments, a minor using the PG App may only interact with individuals who have been approved by the minor's guardian(s). For example, if two minors wish to connect and message each other through the PG App, both of their guardians would need to approve the connection. In other words, the system may require a four-way approval: i.e., approval by the two minors and their guardians (certain approvals may be implicit, such as the party who initiated the connection request implicitly approved the connection). If instead the minor is requesting connection with a non-minor or a second minor who is using a regular GU App, then only a three-way approval would be needed: i.e., approval by the minor, his/her guardian, and the other party with whom the minor wishes to connect.

In particular embodiments, a minor may establish connections with others through the PG App. In particular embodiments, the PG App may disallow general user discovery (e.g., searching by name, location, etc.) to further prevent minors from being exposed through the platform. Instead, the PG App may limit user discovery based on explicit username entry. For example, in order for a minor to be discovered, his/her exact user name may need to be known to the discovering party. For instance, a minor may ask a classmate for his username and use it to find the classmate through the PG App.

In particular embodiments, the PG App may allow a minor to initiate a request to connect with another minor. If a minor wishes to connect with another minor, he/she may submit a connection request through the PG App. For example, the minor may enter his classmate's username or user ID to discover the classmate, and instruct the App to send a connection request to the classmate. In particular embodiments, the request may be handled by the backend social-networking system. In response to the request, the social-networking system may send notifications to those whose approval is needed in order to establish the connection. In addition, a request edge between the two minors may be created in the social graph to represent the current status of the connection request (in this case, a request edge indicates that the connection request is pending approval), and the request edge may remain until the connection has been approved by the appropriate parties, if any. In particular embodiments, approvals from the other minor and the guardians of both minors may be required, in which case the system may send approval requests to the other minor as well as the listed guardians of both minors (e.g., the guardians may be identified based on their accounts being linked to that of the minors). In particular embodiments, approval by the other minor may not be needed, in which case the system may only send approval requests to the guardians of both minors. If approval from the other minor is needed, he/she may approve or deny the connection request via his/her PG App. As for the guardians, an approval request may be sent to each guardian through, e.g., his/her GU App, social-networking app (e.g., as a notification), email, etc. When all necessary parties have approved the connection, the connection is established and the minors may thereafter interact with each other through the PG App. On the system backend, a connection edge may replace the request edge to represent an approved connection between the minors. If any of the parties (i.e., the two minors and their guardians) at any time thereafter revoke the approval, the system may remove the connection edge and the minors would no longer be able to interact with one another. In addition, the system may remove the minor from any conversation thread involving the disconnected minors.

In particular embodiments, the PG App may allow a minor and a non-minor (e.g., an adult or another minor who is using a regular account) to be connected. In other embodiments, the PG App may allow a minor to initiate a connection request with a non-minor. Thus, if a minor wishes to connect with another user who has a regular account (e.g., an uncle, grandparent, a teacher, another minor, etc.), he/she may also submit a connection request through the PG App. In response, the social-networking system may create a request edge in the social graph to represent the current pending state of the connection request. The system may then send the guardian of the minor an approval request. The system may also send the connectee an approval request. Since the connectee has a regular account, no approval from his/her guardian is necessary to establish a connection, even if the connectee is in fact a minor. Thus, in this connection scenario, only a 3-way approval is required (i.e., implicit approval by the requesting minor and explicit approvals by the minor's guardian(s) and the connectee). In particular embodiments, the PG App may disallow a minor from initiating a connection request with a non-minor. If so, a guardian would have to initiate the connection requested on behalf of the minor, as described below. Further, the PG App may not allow a minor to approve a connection from an adult—only the guardian may approve such a connection request.

In particular embodiments, a guardian may also initial connection requests on behalf of an associated minor. For example, a guardian may do so while setting up the minor's account via the PG App, or through the guardian's social-networking user interface (e.g., through a general messaging app). For instance, a guardian may select a connectee and submit connection requests on behalf of the minor. In doing so, the guardian implicitly approved the connection, and therefore no further approval is needed from the guardian.

As such, the social-networking system may send connection requests to the connectee and, if applicable, the connectee's guardian(s). In particular embodiments, the system may also send a connection request to the minor to allow him/her to have a say in whether the connection may be created. In response to a guardian-initiated connection request, the social-networking system may create a request edge between the minor and the connectee. Approval by the connectee and his/her guardian would only cause a connection to be created between the connectee and the minor, and not between any of the other parties involved. For instance, no resulting connection would be created for any of the guardians (e.g., the minor's guardian would not be connected to the connectee or his/her guardian, and the connectee's guardian would not be connected to the minor or his/her guardian).

In particular embodiments, a guardian may also pre-define a list of approved users for a minor, which may be used to simply the approval process for the guardian. For example, a guardian may pre-approve specific individuals (e.g., certain relatives or friends) or a group/network of individuals (e.g., those belonging to a group, organization, team, school, class, etc., or within degrees of separation from the first guardian or the minor, etc.). The pre-approval may also be based on rules. For example, a guardian may pre-approve individuals who are within one or two degrees of separation from the guardian (e.g., the guardian's friends) or from the minor himself, or minors who are under the guardianship of those within a specified degree of separation from the guardian. Thereafter, if the minor for whom the pre-approval list was created requests to be connected to an individual within the pre-approval list or receives a connection request from such individual, the guardian would not need to approve the connection again. In particular embodiments, the guardian may still receive a notification that a connection has been made.

In particular embodiments, the PG App may be configured to enforce certain rules to facilitate the objective of providing a safe, supervised online interaction environment for minors. For example, a minor may not be exposed through the PG App (e.g., a minor account may not be searchable or discoverable). As another example, the PG App (or the associated social-networking system) may only allow a minor to communicate with directly-connected individuals (i.e., within one degree of separation within the social graph). If a connection is already established, a minor may initiate and join 1-to-1 or group chat with other minors. However, if the 1st degree contact is an adult, the PG App in particular embodiments may allow the minor to initiate a 1-to-1 messaging session with that adult, but not a group chat, as it may only be initiated by an adult.

As described above, a connection request may need to be approved in order for the requested connection to be established. The connection request may be placed in different states depending on responses (or lack thereof) from the actors (i.e., those from whom approval is sought). For example, until a connection request is made between two entities, the two are considered to be unconnected. Once a request has been made to connect a minor with a connectee (the request may be initiated by the minor or his/her guardian), a request edge may be created between the minor and the connectee. The request may be in a pending state while one or more actors have yet to approve the connection request and while no negative action has been taken by any of the actors. In particular embodiments, a negative action may include a rejection or a block. If one or more of the actors rejected the connection request, the connection would not be established, but the request may be reissued. If one or more of the actors blocked the connection request, the connection would not be established and the request may not be reissued unless the block is removed.

FIG. 1 illustrates an example method 100 for establishing a connection between a minor and another user. The method may begin at step 110, where a computing system (e.g., one that is associated with a social-networking system) may receive a request to connect a minor with another user within a social-networking system. The minor may be associated with a first account, which may be of a minor-account type, and the other user may be associated with a second account. At step 120, the system may identify a first guardian of the minor. The first guardian's account may be linked to the first account associated with the minor. At step 130, the system, depending on whether the connection request is initiated by the minor or the first guardian, may send a first approval request to the minor or the first guardian to seek approval of the requested connection between the minor and the other user. At step 133, the first approval request may be sent to the first guardian upon determining that the request is initiated by the minor. Alternatively, at step 136 the first approval request may be sent to the minor upon determining that the request is initiated by the first guardian. At step 140 the system may further send a second approval request to the other user to seek approval of the requested connection between the minor and the other user. If the second account associated with the other user is of the minor-account type (step 150), the system may identify a second guardian of the other user (step 153). The second guardian's account may be linked to the second account associated with the other user. At step 156, the system may send a third approval request to the second guardian to seek approval of the requested connection between the minor and the other user. At step 160, for each of the approval requests sent, the system may receive an approval in response (e.g., the system may receive approvals for the first, second, and third (if sent) approval requests). At step 170, the system may establish a connection between the minor and the other user. Thereafter, the system may receive a termination request to terminate the connection between the minor and the other user. The termination request may be initiated by the minor, the first guardian of the minor, the other user, or the second guardian of the other user. In response, the system may terminate the established connection between the minor and the other user.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for establishing a connection between a minor and another user including the particular steps of the method of FIG. 1, this disclosure contemplates any suitable method for establishing a connection between a minor and another user, including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

In particular embodiments, the PG App may also allow group interaction, such as group chat, where a group of three or more users may collectively interact and share a common experience. To ensure that a minor interacts with others in a safe, approved environment, the PG App may require participants in a group chat to be mutually connected. For example, if a group of three friends A, B, and C are to engage in a group chat, A would need to be connected with B and C, B would need to be connected with A and C, and C would need to be connected with A and B.

When a minor invites select invitees to a chat group, a corresponding user interface may be created. In particular embodiments, the PG App may determine whether the connection requirements for a chat group are met. For instance, if full connectivity is required, then if any pair of invitees is not connected, the chat group may remain in a pending state until full connectivity is established. In particular embodiments, the backend system (e.g., the social-networking system) may send those who need to be connected, as well as their guardians, if applicable, connection requests so that the needed connections may be established. As an example, if a group chat is to include a total of three users, users A, B, and C, and users B and C are not yet connected, connection requests may be sent to users B and C so that they may be connected. If they (and their guardians, if applicable) approve the connection, then the two users may be connected within the social graph. In particular embodiments, the connection may remain established even after the group chat session terminates, so that users B and C may interact with each other in other contexts without additional approval.

In particular embodiments, the PG App may be configured to enforce rules that govern when a group chat thread may be enabled and how additional participants may be invited. For example, in one embodiments, a group of minors may need to be fully connected in order for them to participate in a group chat. As another example, if a group consists of both minors and adults, each minor may have to be directly connected to every other person in the group, but there is no connection requirement between the adults. With respect to adding users to an ongoing thread, an adult may be added to a group thread, but the addition may need to be initiated by another adult in the group and only if the added adult is fully connected to all minors in the group thread (the added adult need not be connected to the other adults in the group thread). If the added adult is not fully connected with the minors, then an error message may be displayed and no connection request will be dispatched. Alternatively, connection requests may be sent to the necessary parties, such as the minors in the group who are not yet connected to the new adult, as well as their guardians. In particular embodiments, a guardian may add a minor under his/her guardianship to a group thread with other adults. Doing so may not automatically connect the minor with those other adults, and therefore the minor may not subsequently contact any of those adults, or vice versa, without express approval from his/her guardian. In particular embodiments, a guardian may add a minor under his/her guardianship to a group thread with other minors, provided that the added minor is fully connected to those other minors. If such connection is absent, connection requests may be sent to those whose approve are needed to establish the necessary connections.

In particular embodiments, the chat group interface may allow participates who are connected to begin interacting while connection approvals remain pending for other participants. In an example scenario, a chat group may consist of four users, A, B, C, and D. If users A, B, and C are already mutually connected, they may begin interacting despite user D not being connected with everyone else (e.g., user D may be connected with users A and C but not with user B). In this scenario, users A, B, and C may begin interacting, while user D's user interface may only show that connection approval is pending and not show any of the ongoing interactions between the other users nor allow user D to participate in the current group chat. In particular embodiments, the PG App may allow multiple subgroups to begin interacting while full connectivity is pending. For example, if the list of invitees to a group chat include two groups of mutually connected users, then each group of mutually connected users may begin group chatting while full mutual connectivity between all invitees is pending. Members of each group may only see and participate in the conversation between members of that group, and would not be able see or participate in the other group's conversation. Once full connectivity is established, then everyone may see and participate in the same group chat.

In particular embodiments, while approval is pending, those invited to the group may see whose action is required. For example, if user D and/or her guardian have yet to approve, other users invited to the group may see that action from user D and/or her guardian is in a pending state. The PG App may provide an option to the other users to ping either user D and/or her guardian to approve the connection.

In situations where a user needs to approve several connections (e.g., the guardian of user D may need to approve connections between user D and both users B and C), a single consolidated approval request may be sent to that user. An affirmative response to such a consolidated request by the actor may trigger the creation of multiple corresponding connections. Continuing the example above, if user D's guardian approves the connection, connections would be established between (1) user D and user B, and (2) user D and user C. This may simplify the approval process for those from whom approval is sought, especially for large groups.

Figure 2:
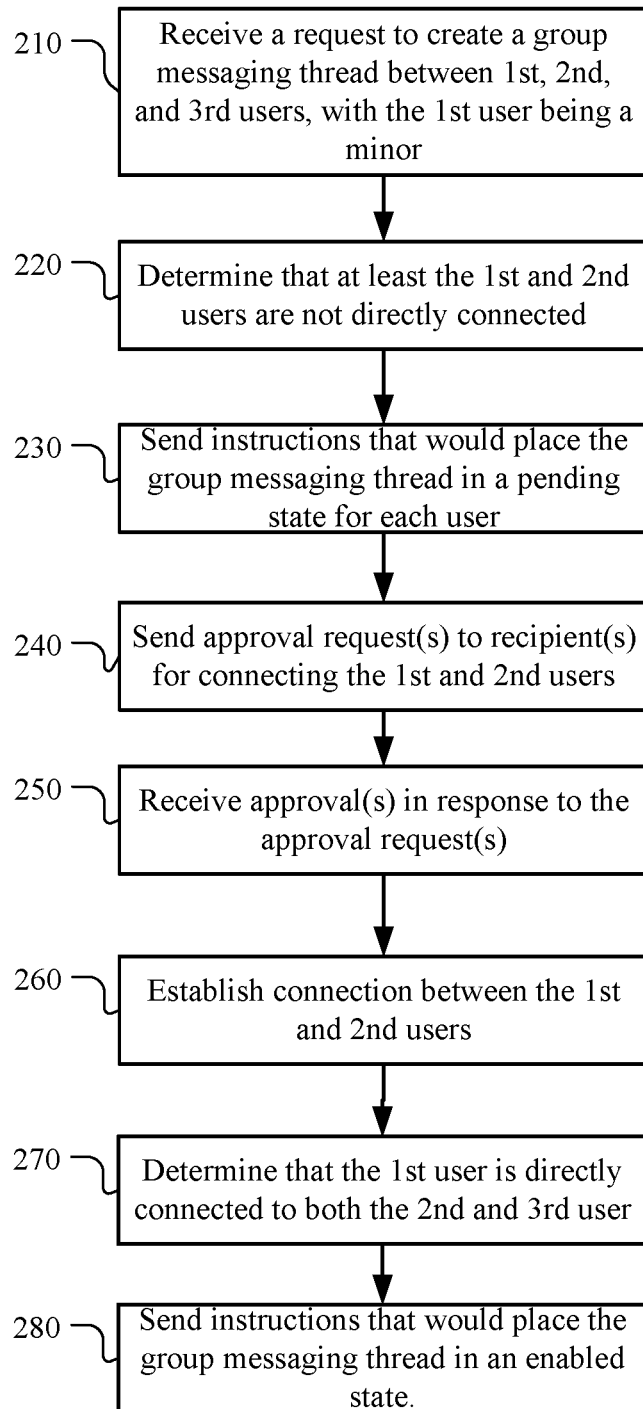
FIG. 2 illustrates an example method for enabling a group message thread involving a minor.

FIG. 2 illustrates an example method 200 for enabling a group message thread involving a minor. The method may begin at step 210, where a computing system (e.g., one associated with a social-networking system) may receive a request to create a group messaging thread. The request may identify a first user, a second user, and a third user. The first user, the second user, and the third user may be associated with a first account, a second account, and a third account, respectively. In one scenario, the first account is of a minor-account type. At step 220, the system may determine that at least the first user and the second user are not directly connected within a social graph. At step 230, the system may send first instructions to messaging applications of the first user, the second user, and the third user. The first instructions may be configured to cause the messaging applications to place the group messaging thread in a pending state. At step 240, the system may send one or more approval requests to one or more recipients, respectively, for connecting the first user and the second user. For example, the approval requests may comprise a first approval request sent to a first guardian associated with the first user and a second approval request sent to the second user. In a situation where the second account associated with the second user is of the minor-account type, the one or more approval requests may further comprise a third approval request sent to a second guardian associated with the second user. In a situation where the request is initiated by the third user, the one or more approval requests may further comprise a third approval request sent to the first user. At step 250, the system may receive one or more approvals in response to the one or more approval requests, respectively. At step 260, in response to the received one or more approvals, the system may establish a connection between the first user and the second user in the social graph. At step 270, the system may determine that the first user is directly connected to both the second user and the third user. At step 280, the system may send second instructions to the messaging applications of the first user, the second user, and the third user. The second instructions may be configured to cause the messaging applications to place the group messaging thread in an enabled state. In a scenario where at least one of the second account and the third account is of the minor-account type, the sending of the second instructions may be contingent upon the first user, the second user, and the third user being directly connected with one another. In a scenario where the second account and the third account are not of the minor-account type, the sending of the second instructions may be contingent upon the first user being directly connected to the second user and the third user. In certain scenarios, the approval requests may be sent to and one of the approvals may be received from the second user, where the approval request sent to the second user may be a request for connecting the second user with the first user and the third user. The approval received from the second user may be an approval for connecting the second user with the first user and the third user. In particular embodiments, while the group messaging thread is in the pending state, the messaging applications may be configured to identify any of the recipients who has not responded to the corresponding approval request. In particular embodiments, the system may receive a ping request from one of the first user, the second user, or the third user, wherein the ping request identifies at least one of the recipients. In response to the ping request, the system may send a reminder to the identified at least one of the recipients to respond to the approval request.

In particular embodiments, the system may receive a request to add a fourth user to the group messaging thread. The system may determine that at least one connection requirement associated with the fourth user is not satisfied. The system may send a third instruction to a messaging application of the fourth user. The third instruction may be configured to cause the messaging application of the fourth user to place the group messaging thread in a pending state, while the messaging applications of the first user, the second user, and the third user present the group messaging thread in the enabled state. In a scenario where the fourth user is associated with a fourth account, which is of the minor-account type, the at least one connection requirement may require the fourth user to be directly connected with each user in the group messaging thread. In a scenario where the fourth user is associated with a fourth account, which is not the minor-account type, the at least one connection requirement may require the fourth user to be directly connected with each user in the group messaging thread who is associated with an account of the minor-account type. In particular embodiments, while the messaging application of the fourth user is presenting the group messaging thread in the pending state, the messaging application of the fourth user is configured to not display messages sent through the group messaging thread.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for enabling a group message thread involving a minor including the particular steps of the method of FIG. 2, this disclosure contemplates any suitable method for enabling a group message thread involving a minor including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
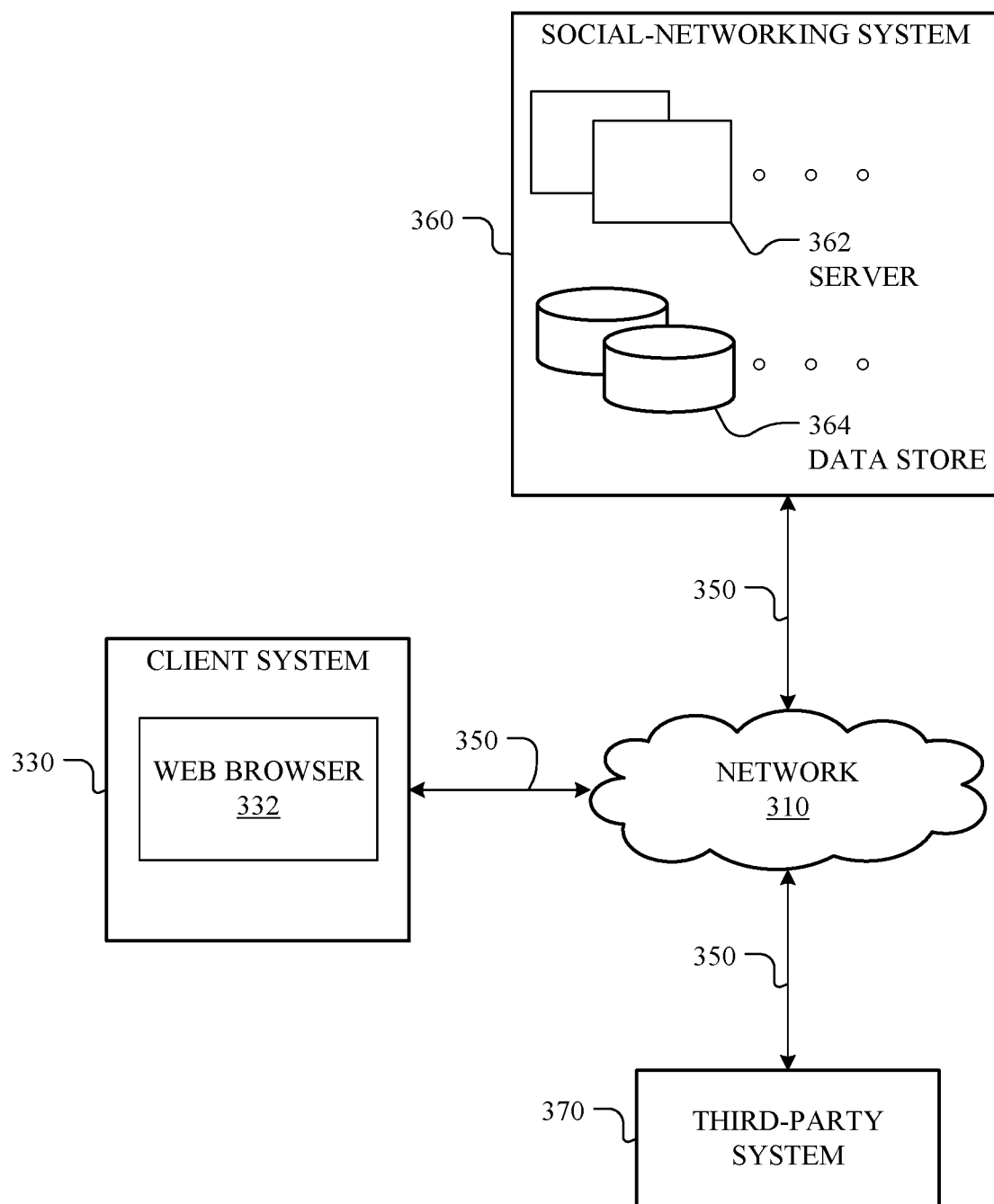
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example and not by way of limitation, client system 330 may access social-networking system 360 using a web browser 332, or a native application associated with social-networking system 360 (e.g., a mobile social-networking application, a messaging application, another suitable application, or any combination thereof) either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
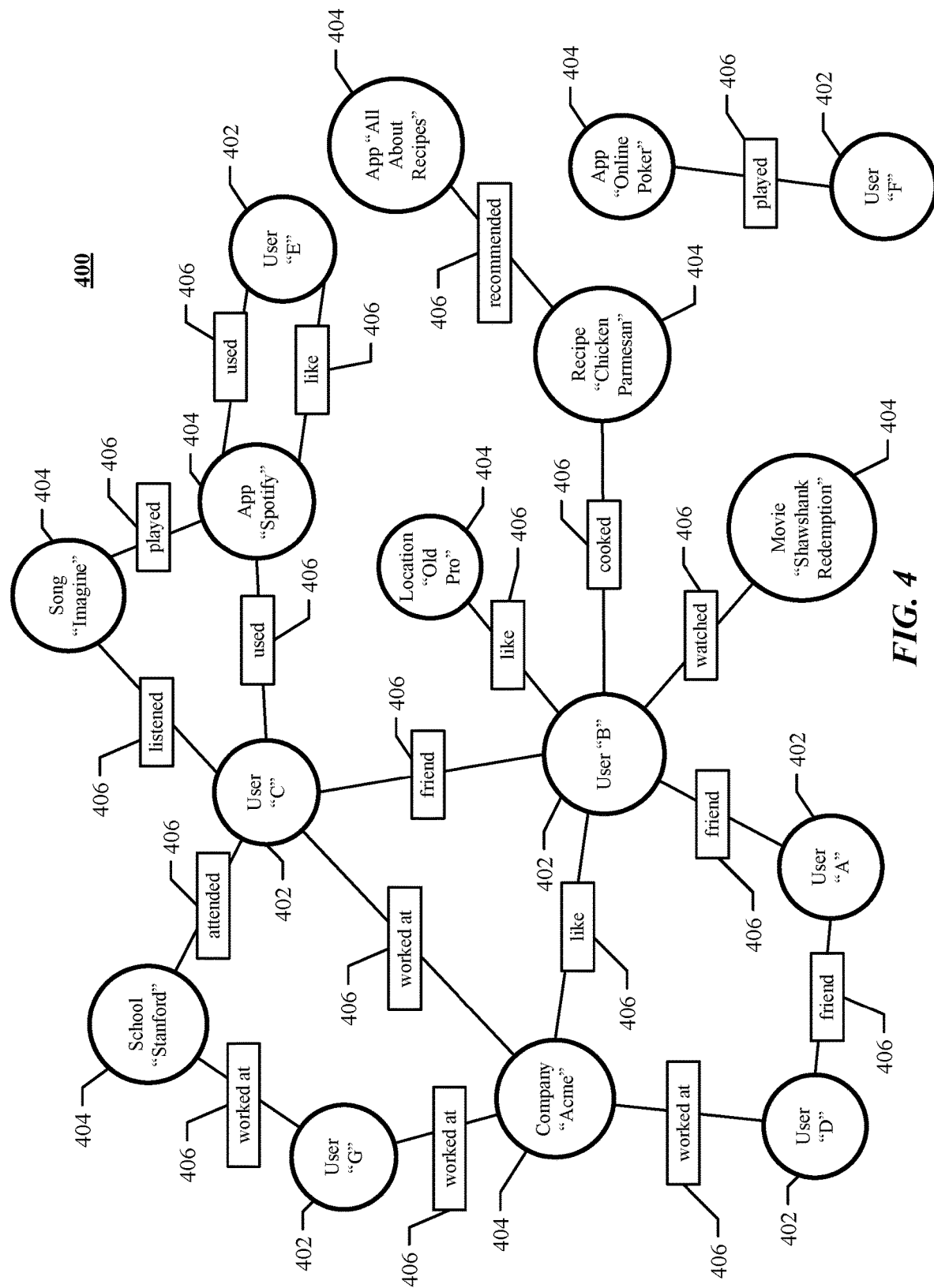
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 370). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 362 may be authorization/privacy servers for enforcing privacy settings. In response to a request from a user (or other entity) for a particular object stored in a data store 364, social-networking system 360 may send a request to the data store 364 for the object. The request may identify the user associated with the request and may only be sent to the user (or a client system 330 of the user) if the authorization server determines that the user is authorized to access the object based on the privacy settings associated with the object. If the requesting user is not authorized to access the object, the authorization server may prevent the requested object from being retrieved from the data store 364, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 5:
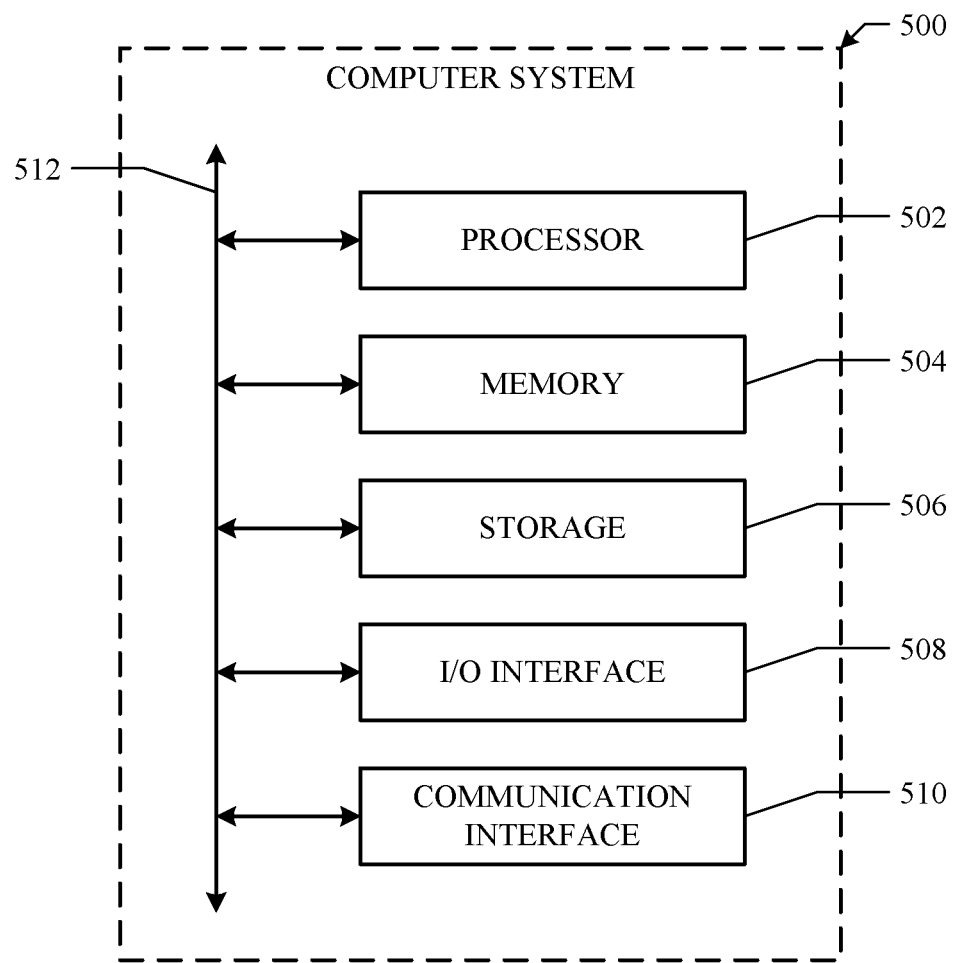
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing system, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method for approving a connection request to establish a connection between a first user account and a second user account registered in a social networking database of a social networking system, the method comprising:
by a computing system, receiving a request for establishing a connection between the first user account and the second user account, wherein the first and second user accounts are established for a first user and a second user of the social networking system, respectively;
by the computing system, identifying a third user account connected to the first user account in the social networking database, the third user account having authority to approve requests for establishing connections involving the first user account;
by the computing system, determining whether the request is initiated by the first user or a third user associated with the third user account;
by the computing system, sending a first approval request seeking approval of the requested connection between the first user account and the second user account, wherein (1) when the request is determined to be initiated by the third user, the first approval request is sent to a first device of the first user, or (2) when the request is determined to be initiated by the first user, the first approval request is sent to a third device of the third user;
by the computing system, sending a second approval request to a second computing device of the second user, the second approval request seeking approval of the requested connection between the first user account and the second user account; and
by the computing system, establishing a connection between the first user account and the second user account upon receiving a set of approvals that comprises: a first approval in response to the first approval request and a second approval in response to the second approval request.

2. The method of claim 1, further comprising:
by the computing system, determining that the second user account is of a minor-account type;
by the computing system, identifying a fourth user account established for a fourth user, wherein a link between the second user account and the fourth user account is established in the social networking database, and the fourth user account is configured to enable the fourth user to approve connection requests for establishing connections involving the second user account; and
by the computing system, sending a third approval request to a fourth device of the fourth user, the third approval request seeking approval of the requested connection involving the first user account and the second user account.

3. The method of claim 1, further comprising:
by the computing system, accessing a graph data structure comprising a plurality of nodes and edges between the nodes, wherein each of one or more of the nodes being associated with one of a plurality of users of the social-networking system; and
by the computing system, in response to the request to connect the first user account with the second user account, generating a request edge between (1) a first node in the graph data structure representing the first user account and (2) a second node in the graph data structure representing the second user account;
wherein the establishing of the connection involving the first user account and the second user account comprises replacing the request edge with a connection edge between the first node and the second node.

4. The method of claim 1, further comprising:
by the computing system, receiving a termination request to terminate the connection involving the first user account and the second user account, wherein the termination request is initiated by the first user, the third user, or the second user; and
by the computing system, terminating the established connection involving the first user account and the second user account.

5. The method of claim 1, wherein the sending of the first approval request to the third device of the third user is further based upon a determination that the second user is not in a list or does not belong to a network of users pre-approved by the third user to connect to the first user.

6. The method of claim 5, wherein the network of users pre-approved by the third user is defined based on a group, organization, team, school, class, or degrees of separation from the third user.

7. The method of claim 1, wherein the first approval request sent may be approved, rejected, or blocked.

8. The method of claim 1, further comprising:
by the computing system, receiving from a first application associated with the first user account a message addressed to the second user account;
by the computing system, determining that the connection between the first user account and the second user account is established; and
by the computing system, delivering the message to a second application associated with the second user account.

9. The method of claim 8, wherein the first application and the second application are different types of applications.

10. The method of claim 1,
wherein the request to connect the first user account with the second user account is received from a first application associated with the first user account; and
wherein usage of the first application by the first user is approved by the third user.

11. The method of claim 10, wherein the third user approved usage of the first application by:
logging into the first application using the third user's credentials for the social-networking system; and
indicating that the first user account associated with the first user is approved to use the first application.

12. The method of claim 11,
wherein the first user account associated with the first user is created by the third user through the first application; and wherein upon creation the first user account is linked to the third user account.

13. The method of claim 1, further comprising:
by the computing system, sending a notification regarding the established connection to a third application associated with the third user account after a predetermined time period since the establishing of the connection.

14. One or more computer-readable non-transitory storage media embodying software for approving a connection request to establish a connection between a first user account and a second user account registered in a social networking database of a social networking system, the software is operable when executed to:
receive a request for establishing a connection between the first user account and the second user account, wherein the first and second user accounts are established for a first user and a second user of the social networking system, respectively;
identify a third user account connected to the first user account in the social networking database, the third user account having authority to approve requests for establishing connections involving the first user account;
determine whether the request is initiated by the first user or a third user associated with the third user account;
send a first approval request seeking approval of the requested connection between the first user account and the second user account, wherein (1) when the request is determined to be initiated by the third user, the first approval request is sent to a first device of the first user, or (2) when the request is determined to be initiated by the first user, the first approval request is sent to a third device of the third user;
send a second approval request to a second computing device of the second user, the second approval request seeking approval of the requested connection between the first user account and the second user account; and
establish a connection between the first user account and the second user account upon receiving a set of approvals that comprises: a first approval in response to the first approval request, and a second approval in response to the second approval request.

15. The media of claim 14, wherein the software is further operable when executed to:
determine that the second user account is of a minor-account type;
identify a fourth user account established for a fourth user, wherein a link between the second user account and the fourth user account is established in the social networking database, and the fourth user account is configured to enable the fourth user to approve connection requests for establishing connections involving the second user account; and
send a third approval request to a fourth device of the fourth user, the third approval request seeking approval of the requested connection involving the first user account and the second user account.

16. The media of claim 14, wherein the software is further operable when executed to:
access a graph data structure comprising a plurality of nodes and edges between the nodes, wherein each of one or more of the nodes being associated with one of a plurality of users of the social-networking system; and
in response to the request to connect the first user account with the second user account, generate a request edge between (1) a first node in the graph data structure representing the first user account and (2) a second node in the graph data structure representing the second user account;
wherein the establishing of the connection involving the first user account and the second user account comprises replacing the request edge with a connection edge between the first node and the second node.

17. The media of claim 14, wherein the software is further operable when executed to:
receive a termination request to terminate the connection involving the first user account and the second user account, wherein the termination request is initiated by the first user, the third user, or the second user; and
terminate the established connection involving the first user account and the second user account.

18. A system for approving a connection request to establish a connection between a first user account and a second user account registered in a social networking database of a social networking system, the system comprising:
one or more processors; and
one or more computer-readable non-transitory storage media coupled to one or more of the processors and comprising instructions operable when executed by one or more of the processors to cause the system to:
receive a request for establishing a connection between the first user account and the second user account, wherein the first and second user accounts are established for a first user and a second user of the social networking system, respectively;
identify a third user account connected to the first user account in the social networking database, the third user account having authority to approve requests for establishing connections involving the first user account;
determine whether the request is initiated by the first user or a third user associated with the third user account;
send a first approval request seeking approval of the requested connection between the first user account and the second user account, wherein (1) when the request is determined to be initiated by the third user, the first approval request is sent to a first device of the first user, or (2) when the request is determined to be initiated by the first user, the first approval request is sent to a third device of the third user;
send a second approval request to a second computing device of the second user, the second approval request seeking approval of the requested connection between the first user account and the second user account; and
establish a connection between the first user account and the second user account upon receiving a set of approvals that comprises: a first approval in response to the first approval request and a second approval in response to the second approval request.

19. The system of claim 18, wherein the processors are further operable when executing the instructions to:
determine that the second user account is of a minor-account type;
identify a fourth user account established for a fourth user, wherein a link between the second user account and the fourth user account is established in the social networking database, and the fourth user account is configured to enable the fourth user to approve connection requests for establishing connections involving the second user account; and send a third approval request to a fourth device of the fourth user, the third approval request seeking approval of the requested connection involving the first user account and the second user account.

20. The system of claim 18, wherein the processors are further operable when executing the instructions to:

access a graph data structure comprising a plurality of nodes and edges between the nodes, wherein each of one or more of the nodes being associated with one of a plurality of users of the social-networking system; and in response to the request to connect the first user account with the second user account, generate a request edge between (1) a first node in the graph data structure representing the first user account and (2) a second node in the graph data structure representing the second user account;

wherein the establishing of the connection involving the first user account and the second user account comprises replacing the request edge with a connection edge between the first node and the second node.

\* \* \* \* \*